United States Patent Office 3,261,876
Patented July 19, 1966

3,261,876
METHOD FOR PRODUCING VICINAL POLYMETHYLBENZENES
Stephen N. Kovach, Highland, Ind., assignor, by mesne assignments, to Sinclair Research, Inc., New York, N.Y., a corporation of Delaware
No Drawing. Filed July 6, 1961, Ser. No. 122,068
5 Claims. (Cl. 260—668)

The present invention relates to a method for the production of vicinal polymethylcyclohexanes of 8 to 10 carbon atoms. In one embodiment the invention relates to the production of vicinal polymethylbenzenes, that is, ortho xylene, hemimellitine, and prehnitene, which find utility as commercial solvents or intermediates. For instance, polymethylbenzenes may be oxidized to carboxylic acids which can be employed, for example, in the production of synthetic resins, etc.

It is known that polymethylbenzenes are often formed in isomerization, disproportionation or reforming operations. Unfortunately, however, the thermodynamic equilibrium of these operations does not favor the formation of the vicinal polymethylbenzene, the tendency being toward the other isomers. Consequently, the vicinal polymethylbenzene yield resulting from these operations has been quite low and leaves much to be desired.

I have discovered that polymethylcyclohexanes of $C_9$ to $C_{11}$ carbon atoms whose methyl groups are on separate carbon atoms, can be demethylated in accordance with the process of the present invention to result in good yields of lower molecular weight vicinal polymethylcyclohexanes to the substantial exclusion of non-vicinal polymethylcyclohexanes of similar molecular weight. Thus vicinal polymethylbenzenes to the substantial exclusion of non-vicinal polymethylbenzenes of the same molecular weight can be obtained by simply dehydrogenating the vicinal polymethylcyclohexanes produced by the demethylation operation. The term "vicinal" as applied to both the polymethylbenzene and polymethylcyclohexane product of the present invention means all the methyl groups being substituted on ring carbon atoms which are adjacent to each other with only a single methyl group on a given carbon atom. The number of methyl substitutents in the vicinal polymethylbenzenes and vicinal polymethylcyclohexanes produced by the process of the present invention can vary from 2 to 4, preferably from 2 to 3. The term "non-vicinal" as employed herein refers to a compound containing 2, 3 or 4 methyl groups on separate ring carbon atoms, at least one of which methyl groups is substituted on a ring carbon that is not adjacent to the ring carbons substituted with the other methyl groups. The preferred feed of the present invention is a non-vicinal polymethylcyclohexane of $C_9$ to $C_{10}$ carbon atoms, having 3 to 4 methyl groups on separate carbon atoms, more preferably wherein only a single methyl group is in a non-vicinal position with respect to the other methyl groups. Thus, using the method of the present invention high selective yields of ortho xylene and hemimellitine can be produced from non-vicinal trimethylcyclohexane and tetramethylcyclohexane by the removal of one or two non-vicinal methyl groups as the case may be.

The demethylation step of the present method is conducted by contacting the non-vicinal polymethylcyclohexane in the presence of molecular hydrogen with a catalyst consisting essentially of nickel and a siliceous base carrier component at a temperature of about 400 to 1000° F., preferably about 500 to 800° F., a pressure ranging from atmospheric to about 1000 p.s.i.g., preferably about 50 to 500 p.s.i.g.; a weight hourly space velocity of about .1 to 10 and a hydrogen to hydrocarbon ratio of about 1 to 20:1.

The catalyst of the demethylation step of the present invention contains about 10 to 70% nickel, preferably about 30 to 60%, supported on a siliceous carrier. The carrier component can be any material of predominantly siliceous character and includes naturally occurring materials such as diatomaceous earth or kieselguhr, and other silica-based compositions, synthetic silica-based compositions, for instance, synthetic silica gel compositions such as silica-alumina, silica-magnesia, silica-zirconia, etc. The preferred support is kieselguhr.

The nickel metal component of the demethylation catalyst can be added to the support by known procedures. Employing the preferred kieselguhr support, the catalyst can be made, for instance, by the general steps of suspending the kieselguhr in a dilute aqueous solution of nickel sulfate and then gradually adding thereto an excess of a hot saturated solution of sodium carbonate. The mixture of nickel sulfate solution and kieselguhr is agitated vigorously while the sodium carbonate solution is introduced thereto to form a precipitate on the kieselguhr which is then filtered, washed, dried, calcined and reduced with hydrogen. Reduction of the catalyst to carry the nickel essentially to the elemental state can be accomplished at a temperature of about 400 to 700° C. or more prior to use or it can be accomplished under the conditions existing in the reactor.

The dehydrogenation step of the present invention can be conducted under dehydrogenation conditions and any suitable dehydrogenation catalyst can be employed, such as those containing a metal having an atomic number of 23 to 29, i.e. vanadium, chromium, Group VIII transition metals and copper; a metal of the Group VI(a) series other than the aforementioned chromiums, e.g. molybdenum and tungsten; or a platinum group metal (i.e. Pt, Pd, Ru, Rh, Os and Ir). Combinations of the metals may be employed, for instance, a Group VIII iron transition metal along with Mo or W. The promoting metal may be supported on a solid carrier such as activated alumina, silica, etc., and the metal may be in its free state or as an oxide, sulfide or other compound. When supported on a solid carrier the promoting metal is usually the minor portion of the catalyst, e.g. less than 30%, but sufficient to give the desired catalytic effect. It is preferred to employ a platinum group metal-alumina containing about 0.1 to 2 percent of a platinum group metal on an activated alumina. The preferred dehydrogenation conditions are approximately as follows:

Temperature _____ °F__ 700–1000
Space velocity (weight of feed per weight
 of catalyst per hour) _____ 0.1–10
Pressure, p.s.i.g. _____ Atm.–1000
$H_2$/hydrocarbon mole ratio _____ 1–20/1

A convenient source of the polymethylcyclohexane starting materials of the present invention are the polymethylbenzenes often formed in hydrocarbon conversion operations. The present invention, therefore, embodies contacting the corresponding polymethylbenzenes of nine or ten carbon atoms with a hydrogenation catalyst and molecular hydrogen under hydrogenation conditions to obtain the described polymethylcyclohexanes and then demethylating and, if desired, dehydrogenating as previously described. The hydrogenation catalyst for the hydrogenation operation can be any of the dehydrogenation catalysts described above. Preferred hydrogenation conditions are approximately as follows:

Temperature _____ °F__ 400–800
Space velocity (WHSV) _____ 0.1–10
Pressure, p.s.i.g. _____ 100–1000
$H_2$/hydrocarbon ratio _____ 1–20/1

The present invention will be further illustrated by the following examples.

EXAMPLE I 1,2,4-trimethylcyclohexane was contacted with a nickel/kieselguhr catalyst containing 60% nickel in the form of nickel oxide at a temperature of 560° F., a pressure of 100 p.s.i.g., a weight hourly space velocity of 0.40 and a $H_2$/hydrocarbon ratio of 10.5. The catalyst was pre-reduced in hydrogen at 550° F. The resulting product analyzed as follows:

*Product distribution (80% liquid recovery based on feed) weight percent feed*

| | |
|---|---|
| Cyclohexane | 2.6 |
| Methylcyclohexane | 21.6 |
| t-1,2-dimethylcyclohexane | 37.7 |
| c-1,2-dimethylcyclohexane | 8.5 |
| Other dimethylcyclohexanes | 2.6 |
| 1,2,4-trimethylcyclohexane | 5.1 |
| 1,2,3-trimethylcyclohexane | --- |
| Paraffins and aromatics | 1.9 |

Examination of the products shows that vicinal polymethylcyclohexanes were formed to the substantial exclusion of non-vicinal polymethylcyclohexanes. The vicinal polymethylcyclohexanes are then removed from the mixture by distillation and subjected to dehydrogenation by contact with a platinum-alumina catalyst containing 0.6% patinum at a temperature of 750° F., a pressure of 50 p.s.i.g., a weight hourly space velocity of 2 and a $H_2$/hydrocarbon ratio of 5/1 to produce the corresponding vicinal polymethylbenzenes.

EXAMPLE II 1,2,3,5-tetramethylcyclohexane was contacted with the catalyst of Example I, at a temperature of 560° F., a pressure of 100 p.s.i.g., a weight hourly space velocity of 0.41 and a $H_2$/hydrocarbon ratio of 11.5. Again the catalyst was pre-reduced in hydrogen at 550° F. The resulting product analyzed as follows:

*Product distribution (70% liquid recovery based on feed), weight percent feed*

| | |
|---|---|
| Cyclohexane | 0.3 |
| Methylcyclohexane | 5.3 |
| t-1,2-dimethylcyclohexane | 26.4 |
| c-1,2-dimethylcyclohexane | 5.0 |
| Other dimethylcyclohexane | --- |
| 1,2,4-trimethylcyclohexane | --- |
| 1,2,3-trimethylcyclohexane | 16.5 |
| 1,2,3,5-tetramethylcyclohexane | 8.5 |
| Paraffins and aromatics | 8.0 |

Examination of the results shows that high yields of lower molecular weight vicinal polymethylcyclohexanes were formed to the substantial exclusion of non-vicinal polymethylcyclohexanes of similar molecular weight. The vicinal polymethylcyclohexanes are then removed from the mixture by distillation and subjected to dehydrogenation in accordance with the dehydrogenation step in Example I to form the corresponding vicinal polymethylbenzenes.

I claim:

1. A method of producing vicinal polymethylbenzenes of 8 to 9 carbon atoms, to the substantial exclusion of non-vicinal polymethylbenzenes of similar molecular weight which consists essentially of hydrogenating a non-vicinal polymethylbenzene of $C_9$ to $C_{10}$ carbon atoms whose methyl groups are on separate ring carbon atoms and wherein only a single methyl group is in a non-vicinal position with respect to the other methyl groups in the presence of a hydrogenation catalyst and under hydrogenation conditions to obtain the corresponding polymethylcyclohexane, contacting said polymethylcyclohexane with hydrogen and a catalyst consisting essentially of nickel supported on a siliceous carrier at a temperature of about 400 to 1000° F. and a pressure of atmospheric to about 1000 p.s.i.g. to produce vicinal polymethylcyclohexane of lower molecular weight to the substantial exclusion of non-vicinal polymethylcyclohexane of the same molecular weight and dehydrogenating the resulting product by contact with a dehydrogenation catalyst under dehydrogenation conditions to obtain the corresponding vicinal polymethylbenzene.

2. The method of claim 1 wherein the siliceous carrier is kieselguhr.

3. The method of claim 1 wherein the temperature is about 500 to 800° F. and the pressure is about 50 to 500 p.s.i.g.

4. The method of claim 1 wherein the polymethylcyclohexane is 1,2,4-trimethylcyclohexane.

5. The method of claim 1 wherein the polymethylcyclohexane is 1,2,3,5-tetramethylcyclohexane.

References Cited by the Examiner

UNITED STATES PATENTS

| | | | |
|---|---|---|---|
| 2,392,749 | 1/1946 | Lewis et al. | 208—60 X |
| 2,411,726 | 11/1946 | Holroyd et al. | 260—666 |
| 2,441,663 | 5/1948 | Haensel et al. | 260—666 |
| 2,642,463 | 6/1953 | Arnold et al. | 260—666 |
| 2,721,226 | 10/1955 | Ciapetta et al. | 260—666 |
| 2,780,661 | 2/1957 | Hemminger et al. | 260—672 X |

FOREIGN PATENTS 830,806  3/1960  Great Britain.

DANIEL E. WYMAN, *Primary Examiner.*

ALPHONSO D. SULLIVAN, *Examiner.*

C. E. SPRESSER, P. P. GARVIN, *Assistant Examiners.*